United States Patent
Turner et al.

(10) Patent No.: US 12,519,729 B2
(45) Date of Patent: Jan. 6, 2026

(54) BANDWIDTH ALLOCATION FOR NODES COUPLED TO AN INTERCONNECT

(71) Applicant: Arm Limited, Cambridge (GB)

(72) Inventors: Andrew John Turner, Cambridge (GB); Shobhit Singhal, Bangalore (IN); Alex James Waugh, Cambridge (GB); Iñaki Abadia Osta, Cambridge (GB)

(73) Assignee: Arm Limited, Cambridge (GB)

( * ) Notice: Subject to any disclaimer, the term of this patent is extended or adjusted under 35 U.S.C. 154(b) by 653 days.

(21) Appl. No.: 17/829,888

(22) Filed: Jun. 1, 2022

(65) Prior Publication Data
US 2023/0396550 A1    Dec. 7, 2023

(51) Int. Cl.
*H04L 47/20* (2022.01)
*H04L 47/25* (2022.01)
*H04L 47/78* (2022.01)

(52) U.S. Cl.
CPC ........... *H04L 47/20* (2013.01); *H04L 47/25* (2013.01); *H04L 47/781* (2013.01)

(58) Field of Classification Search
CPC ....... H04L 47/20; H04L 47/25; H04L 47/781; H04L 47/10; H04L 5/1438; H04L 7/0008
See application file for complete search history.

(56) References Cited

U.S. PATENT DOCUMENTS

| | | | |
|---|---|---|---|
| 2002/0090008 A1* | 7/2002 | Cioffi | H04L 5/1438 370/208 |
| 2008/0218360 A1* | 9/2008 | Nekoda | H04L 43/0817 340/584 |
| 2013/0294236 A1* | 11/2013 | Beheshti-Zavareh | H04L 47/41 370/235 |
| 2021/0100046 A1* | 4/2021 | Nguyen | H04L 5/0058 |

OTHER PUBLICATIONS

Mohammadi et al, "CoAP-Based Remote Network Management Model for Deterministic 6TiSCH Networks" IEEE 2024 (Year: 2024).*
Rpjas-Cessa et al, "Schemes for Fast Transmission of Flows in Data Center Networks" IEEE 2015 (Year: 2015).*

* cited by examiner

*Primary Examiner* — Omer S Mian
(74) *Attorney, Agent, or Firm* — NIXON & VANDERHYE P.C.

(57) ABSTRACT

Interconnect systems and method of operating such are disclosed. A plurality of nodes coupled via a packet transport path form an interconnect and the nodes provide ingress points to the interconnect for a plurality of packet sources. A central controller holds permitted rate indications for each of the plurality of packet sources, in accordance with which each packet source sends packets via the interconnect. The nodes each respond to packet collision event at that node by sending a collision report to the central controller. In response the central controller, in respect of a collision pair (Continued)

of packet sources associated with the packet collision, decreases the permitted rate indication corresponding to a packet source of the collision pair of packet sources which currently has the higher permitted rate indication. Periodically the permitted rate indications of all of the packet sources are increased, subject to a maximum permitted rate indication for each.

20 Claims, 8 Drawing Sheets

| SOURCE | PERMITTED RATE |
|---|---|
| 0 | R0 |
| 1 | R1 |
| 2 | R2 |
| 3 | R3 |
| 4 | R4 |
| 5 | R5 |

FIG. 4A

| RATE COMPARISON DATA | | | | | | |
|---|---|---|---|---|---|---|
| FIRST SOURCE | SECOND SOURCE | | | | | |
| | 0 | 1 | 2 | 3 | 4 | 5 |
| 0 |  | 1 | 1 | 1 | 1 | 1 |
| 1 |  |  | 0 | 1 | 0 | 0 |
| 2 |  |  |  | 1 | 0 | 0 |
| 3 |  |  |  |  | 0 | 0 |
| 4 |  |  |  |  |  | 1 |
| 5 |  |  |  |  |  |  |

BANDWIDTH ALLOCATION FOR NODES COUPLED TO AN INTERCONNECT

TECHNICAL FIELD

The present disclosure relates to data processing. In particular, the present disclosure relates to interconnects and mechanisms for allocation of bandwidth usage of those interconnects.

DESCRIPTION

An interconnect can provide a packet transport path allowing packets to be exchanged between a plurality of nodes. The interconnect inevitably has finite bandwidth for the transportation of packets and in consequence congestion on the interconnect can result. Notably, the use of the interconnect by the plurality of nodes can result in the activity of some nodes being hindered by the activity of other nodes. For example, a highly active node which floods the interconnect with packets to be transported can prevent other nodes (which perhaps only send packets more infrequently) from accessing a reasonable bandwidth of the interconnect.

SUMMARY

In one example embodiment described herein there is an interconnect system comprising:
   a plurality of nodes coupled via a packet transport path to form an interconnect, wherein the plurality of nodes provides ingress points to the interconnect for a plurality of packet sources; and
   a central controller arranged to maintain a permitted rate indication corresponding to each packet source of the plurality of packet sources, wherein each packet source of the plurality of packet sources is arranged to send packets via the interconnect in accordance with its corresponding permitted rate indication,
   wherein each node of the plurality of nodes is responsive to occurrence of a packet collision event at that node to send a collision report to the central controller.
   wherein the central controller is responsive to receipt of the collision report, in respect of a collision pair of packet sources associated with the packet collision, to decrease the permitted rate indication corresponding to a packet source of the collision pair of packet sources which currently has the higher permitted rate indication,
   and wherein the central controller is arranged periodically to increase the permitted rate indications of all of the plurality of packet sources, subject to a maximum permitted rate indication for each of the plurality of packet sources.

In one example embodiment described herein there is a method of operating an interconnect system comprising:
   coupling a plurality of nodes via a packet transport path to form an interconnect, wherein the plurality of nodes provides respective ingress points to the interconnect for a plurality of packet sources;
   maintaining in a central controller a permitted rate indication corresponding to each packet source of the plurality of packet sources, wherein each packet source of the plurality of packet sources is arranged to send packets via the interconnect in accordance with its corresponding permitted rate indication;
   responding, at each node of the plurality of nodes, to occurrence of a packet collision event at that node by sending a collision report to the central controller;
   responding, at the central controller, to receipt of the collision report, in respect of a collision pair of packet sources associated with the packet collision, by decreasing the permitted rate indication corresponding to a packet source of the collision pair of packet sources which currently has the higher permitted rate indication; and
   periodically increasing the permitted rate indications of all of the plurality of packet sources, subject to a maximum permitted rate indication for each of the plurality of packet sources.

BRIEF DESCRIPTION OF THE DRAWINGS

The present invention will be described further, by way of example only, with reference to embodiments thereof as illustrated in the accompanying drawings, in which:

FIG. 4A shows a table giving example permitted rate indications for a number of source nodes coupled to an interconnect in accordance with some disclosed examples;

FIG. 4B shows a table giving example rate comparison data for a number of source nodes coupled to an interconnect in accordance with some disclosed examples:

DESCRIPTION OF EXAMPLE EMBODIMENTS

Figure 1:
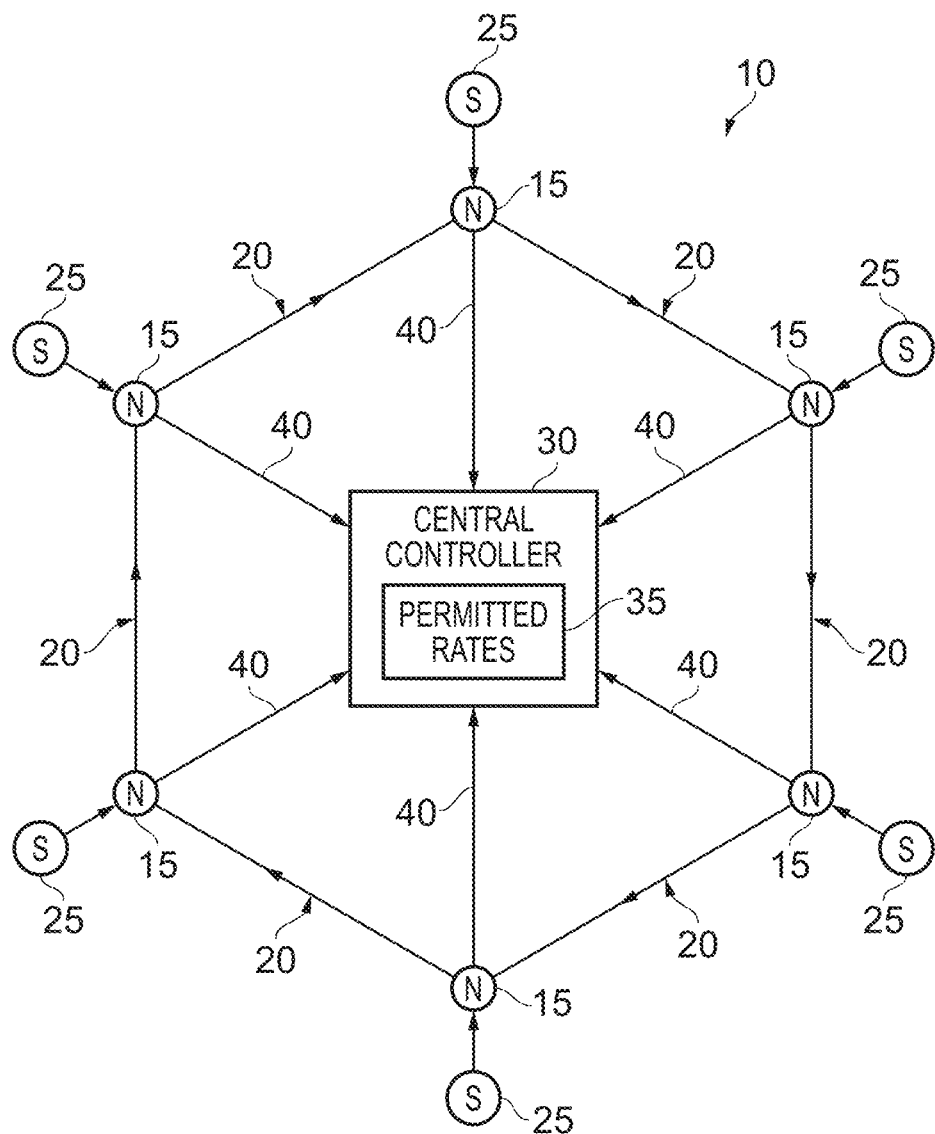
FIG. 1 schematically illustrates a ring interconnect system in accordance with some disclosed examples.

Before discussing the embodiments with reference to the accompanying figures, the following description of embodiments is provided.

In accordance with one example configuration there is provided an interconnect system comprising:
   a plurality of nodes coupled via a packet transport path to form an interconnect, wherein the plurality of nodes provides ingress points to the interconnect for a plurality of packet sources; and
   a central controller arranged to maintain a permitted rate indication corresponding to each packet source of the plurality of packet sources, wherein each packet source of the plurality of packet sources is arranged to send packets via the interconnect in accordance with its corresponding permitted rate indication,
   wherein each node of the plurality of nodes is responsive to occurrence of a packet collision event at that node to send a collision report to the central controller,
   wherein the central controller is responsive to receipt of the collision report, in respect of a collision pair of packet sources associated with the packet collision, to decrease the permitted rate indication corresponding to a packet source of the collision pair of packet sources which currently has the higher permitted rate indication, and wherein the central controller is arranged periodically to increase the permitted rate indications of all of the plurality of packet sources, subject to a maximum permitted rate indication for each of the plurality of packet sources.

The present techniques are based on the recognition that an empirical approach to sharing interconnect bandwidth, based on the observation of packet collisions, can provide a fairer allocation of the bandwidth than a priori approaches which must make assumptions about various parameters of the system which comprises the interconnect, not least the available bandwidth of the interconnect. The inventors have established that in practice it may not even be possible meaningfully to define such a quantity, since it inherently assumes that available bandwidth allocated to a given source node can be fully utilised by that source node, when in reality a number of other factors can significantly affect bandwidth usage, such as the ability of a source node to supply packets for transport, contention between in-transport packets on paths connecting nodes of the system, contention between packets within nodes of the system, the ability of a sink node to receive packets, and so on. Instead the approach taken here is for each node of the plurality of nodes to be arranged to report packet collision events to a central controller, and wherein in response the central controller is arranged to cause a permitted rate (of issuing packets for transport) of a packet source associated with the packet collision event to be decreased. When the packet collision event involves packets from two different sources (noting that this need not always be the case), it is the packet source which currently has the higher permitted rate indication which has its permitted rate indication decreased. Accordingly, a source node which is repeatedly involved in packet collision events will only be permitted to issue packets for transport at a lower and lower rate until such packet collisions (involving that source node) no longer occur or until such packet collisions which do occur involve a collision with another source which has a higher permitted rate. The reduction in permitted packet transmission rates for the sources is balanced by a periodic increase in the permitted rate indications of all of the plurality of packet sources. Appropriate setting of the increments with which the permitted rate indications are decreased and increased can then support an automatic and dynamic determination of appropriate rates for each source which is using the interconnect.

The plurality of nodes may communicate their collision reports to the central controller in a variety of ways. However, in some examples the central controller is arranged to transmit rate comparison information to the plurality of nodes, wherein the rate comparison information indicates for each pair of packet sources which packet source currently has a higher permitted rate indication, and wherein the collision report comprises an indication, for the pair of packet sources associated with the new packet and the older packet, of a culprit packet source, wherein the culprit packet source is the packet source of the collision pair of packet sources which is indicating as having the higher permitted rate indication in the rate comparison information transmitted to the plurality of nodes. This approach enables the plurality of nodes to communicate their collision reports to the central controller in a manner which only requires limited infrastructure (wire count) to support it. By providing the indications, for each pair of packet sources, of which packet source currently has a higher permitted rate indication, the nodes are provided with an efficient (i.e. low bandwidth) mechanism of causing a particular source node to have its permitted rate decreased by the central controller, since only one signal needs sending per source.

The central controller may transmit the rate comparison information to the plurality of nodes in various ways, but in some examples the central controller is arranged to broadcast the rate comparison information to the plurality of nodes.

It has been found that it is sufficient for the rate comparison information to be updated less frequently than, say, the rate at which the collision reports may be provided to the central controller, and accordingly in some examples the central controller is arranged to iteratively broadcast the rate comparison information to the plurality of nodes over a plurality of broadcast cycles. This enables the plurality of nodes to be provided with a dynamic (i.e. broadly speaking up-to-date) status of the rate comparison information, without this provision itself being overly burdensome to the system.

Indeed, still further steps may be taken to reduce the amount and frequency of information which the central controller communicates to the plurality of nodes, and hence in some examples the central controller is arranged to broadcast the rate comparison information to the plurality of nodes as a series of updates, wherein each update of the series of updates conveys changes to the rate comparison information since a last update.

In some examples the central controller is arranged to transmit the rate comparison information to the plurality of nodes via a dedicated rate comparison information signal path distinct from the packet transport path.

In some examples each node of the plurality of nodes is arranged to send the collision report to the central controller via a dedicated collision report signal path distinct from the packet transport path.

This dedicated collision report signal path may be variously configured, but in some examples the system further comprises collision report combination circuitry arranged to combine multiple collision reports pertaining to a particular packet source into a single indication of the particular packet source. This arrangement further supports the aim of enabling the plurality of nodes to communicate their collision reports to the central controller with only limited infrastructure, because it leads to only a single signal (wire) needing to reach the central controller with respect to each packet source.

The collision report combination circuitry may be variously configured, but in some examples the collision report combination circuitry comprises local OR-logic arranged at each node of the plurality of nodes to forward the single indication of the particular packet source when either a collision report for the particular packet source is received from another node or a local collision report for the particular packet source is generated at that node.

The present techniques recognise that congestion in an interconnect may take a variety of forms and in consequence a packet collision event may be variously defined within the scope of the current disclosure. In some examples the packet collision event comprises at least one of:

ingress of a new packet to the interconnect being delayed by an older packet already being transported via the interconnect;

ingress of a first new packet to the interconnect being delayed by substantially simultaneous ingress of a second new packet to the interconnect;

a first in-transport packet being delayed by attempting to use a route or access a packet sink which is respectively in use or being accessed by a second in-transport packet being transported via the interconnect; or an interconnect-exiting packet being unable to be accepted by a packet sink due to the packet sink temporarily being full.

It may be the case that packets can briefly interrupt one another without this being viewed as an actionable event in terms of managing the interconnect bandwidth and accordingly in some examples the packet collision event comprises a delay of more than a defined threshold delay.

It may be desirable for the central controller to be able to influence the interconnect bandwidth usage of the plurality of nodes in an intentionally biased manner. i.e. to prioritise one or more nodes with respect to other nodes. There are a variety of ways in which this may be achieved. In some examples the central controller is arranged to apply a per-packet-source weight to the rate comparison information transmitted to the plurality of nodes. In some examples the central controller is arranged to decrease the permitted rate indications by a weighted decrement individually defined for each packet source. In some examples the central controller is arranged to increase the permitted rate indications by a weighted increment individually defined for each packet source.

The nodes of the interconnect may be variously configured. For example, some may provide ingress points to the interconnect for new packets, some may only act as intermediate transportation nodes, and some may provide egress points from the interconnect for transported packets. In some examples, at least one node of the plurality of nodes provides an ingress point to the interconnect for a plurality of packet sources. In some examples, at least one node of the plurality of nodes does not provide an ingress point to the interconnect for a packet source.

Additionally, the central controller may be provided as an entirely separate component to the plurality of nodes, whereas in some examples the central controller is comprised in a node of the plurality of nodes.

The interconnect itself may take various forms. In particular, in some examples the plurality of nodes is coupled via the packet transport path to form a ring interconnect. In some examples, the plurality of nodes is coupled via the packet transport path to form a mesh interconnect.

In accordance with one example configuration there is provided a method of operating an interconnect system comprising:

coupling a plurality of nodes via a packet transport path to form an interconnect, wherein the plurality of nodes provides respective ingress points to the interconnect for a plurality of packet sources;

maintaining in a central controller a permitted rate indication corresponding to each packet source of the plurality of packet sources, wherein each packet source of the plurality of packet sources is arranged to send packets via the interconnect in accordance with its corresponding permitted rate indication;

responding, at each node of the plurality of nodes, to occurrence of a packet collision event at that node by sending a collision report to the central controller;

responding, at the central controller, to receipt of the collision report, in respect of a collision pair of packet sources associated with the packet collision, by decreasing the permitted rate indication corresponding to a packet source of the collision pair of packet sources which currently has the higher permitted rate indication, and periodically increasing the permitted rate indications of all of the plurality of packet sources, subject to a maximum permitted rate indication for each of the plurality of packet sources.

Particular embodiments will now be described with reference to the figures.

FIG. 1 illustrates a system 10 in accordance with some examples. The system comprises a plurality of nodes 15, which are coupled via a packet transport path 20 to form an interconnect, which in the illustrated example is in the form of a ring interconnect. Each of the nodes 15 provides an ingress point to the ring interconnect for packets which originate from sources 25. In the example of FIG. 1, there is a one-to-one correspondence between the sources 25 and the nodes 15, but this need not be the case and in other example configurations there may be nodes which do not have an associated packet source and/or there may be nodes which are coupled to more than one packet source. The nodes 15 are also in communication with a central controller 30. The central controller 30 generally administers control over the ring interconnect and in particular determines the respective rates with which each packet source 25 is permitted to issue packets for transport via the ring interconnect. As part of this control the central controller 30 holds a set 35 of permitted rate indications corresponding to the plurality of packet sources 25. Each packet source of the plurality of packet sources is arranged to issue packets for transportation via the interconnect at a rate in accordance with its corresponding permitted rate indication.

Each of the plurality of nodes 15 is arranged to convey incoming packets from its respective packet source 25 onto the interconnect 20, whereby this may involve arbitration between such ingressing packets and packets which are already being transported around the interconnect. Indeed, packet handling arbitration at the nodes may be required in other cases too, such as when a packet source (or two packet sources—see later examples in the figures which follow) provides two packets which are in competition for ingress to the interconnect, i.e. within a given time window defined by the given frequency with which the node can pass single packets to the interconnect, two packets are queued up and only one can be serviced. In such an event, referred to herein as a packet collision event, the relevant node is arranged to send a collision report to the central controller. Indeed, packet collision events can have other causes as well, which may relate more to the destination of such packets, such as when a packet being transported by the interconnect is delayed by attempting to use a route or access a packet sink (i.e. packet destination) which is respectively in use or being accessed by another packet currently being transported via the interconnect. Each of the packet sources 25 may also for illustrative purposes be considered to be a packet sink. Another way in which a packet collision event can occur is when a packet which has already been conveyed by the interconnect seeks to exit the interconnect at the corresponding node but cannot do so because its target packet sink is temporarily not accepting packets (e.g. its input buffer is full).

Regardless of the cause of the packet collision, each node is arranged to report such packet collision events to the central controller. FIG. 1 shows a set of dedicated paths 40 for this purpose. In response the central controller is arranged to modify a permitted rate corresponding to one of the two packet sources associated with the reported collision event. The packet source selected to have its permitted rate reduced is that which currently has the higher permitted rate indication of the two. In this manner, a packet source which causes packet delays (due to packet collisions) for other packet sources will have its permitted rate reduced. Indeed, if it continues to be involved in packet collision events, the packet source will continue to have its permitted rate reduced whenever it has a higher permitted rate than the other packet source with which it is come into conflict. This technique ensures that packet transmission rates from the respective packet sources are fairly reduced, either until such packet collisions do not occur or until it is another packet source involved in the packet collision which is deemed to have the higher permitted rate and therefore has its permitted rate reduced instead. Moreover, such reductions are not monotonic, as the central controller is arranged periodically to increase the permitted rate indications of all of the plurality of packet sources, where such increases are each subject to a maximum permitted rate indication for each of the plurality of packet sources. This maximum permitted rate indication may be universal or may be individually defined for the respective packet sources.

Figure 2:
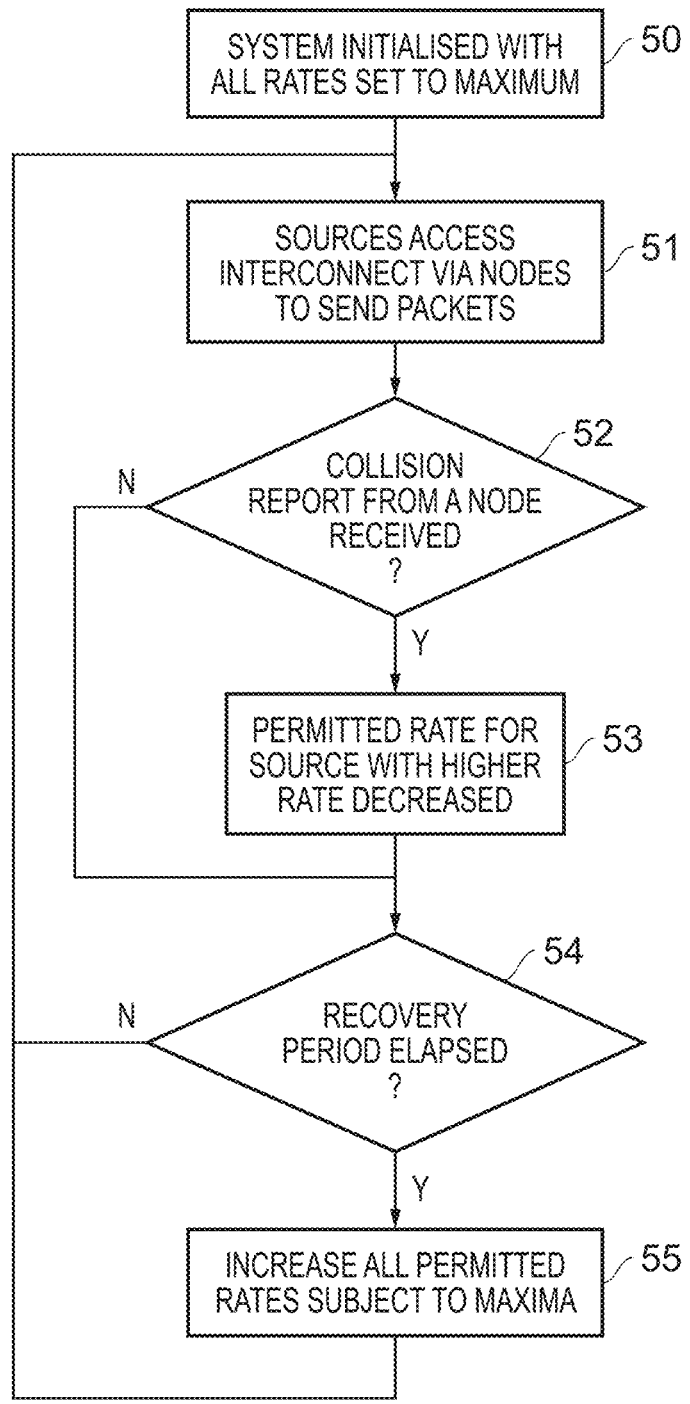
FIG. 2 is a flow diagram showing a sequence of steps which are taken in accordance with the method of some disclosed examples.

FIG. 2 is a flow diagram showing a sequence of steps which are taken in accordance with the method of some disclosed examples. In a first initialisation step 50, the system is initialised with all permitted rates for all packet sources set by the central controller to maximum values (either individual or universal). Then at step 51 the system begins operation and the packet sources access the interconnect via nodes forming part of the interconnect in order to send packets. This operational use of the interconnect continues and at step 52 it is determined whether any collision reports from the nodes have been received by the central controller. Whilst this is not the case the flow skips to step 54 and it is determined whether a recovery period (for which the central controller maintains a timer) has elapsed. Whilst it is not the flow returns to step 51 and usage of the interconnect continues. However, when it is determined at step 52 that a collision report has been received from at least one of the nodes, then at step 50 the permitted rate for the packet source involved in the packet collision with a currently higher permitted rate is decreased. The flow continues to step 54. When at step 54 it is determined that the recovery period has elapsed then at step 55 the central controller increases all permitted rates, subject to defined maxima (either individual or universal).

Figure 3:
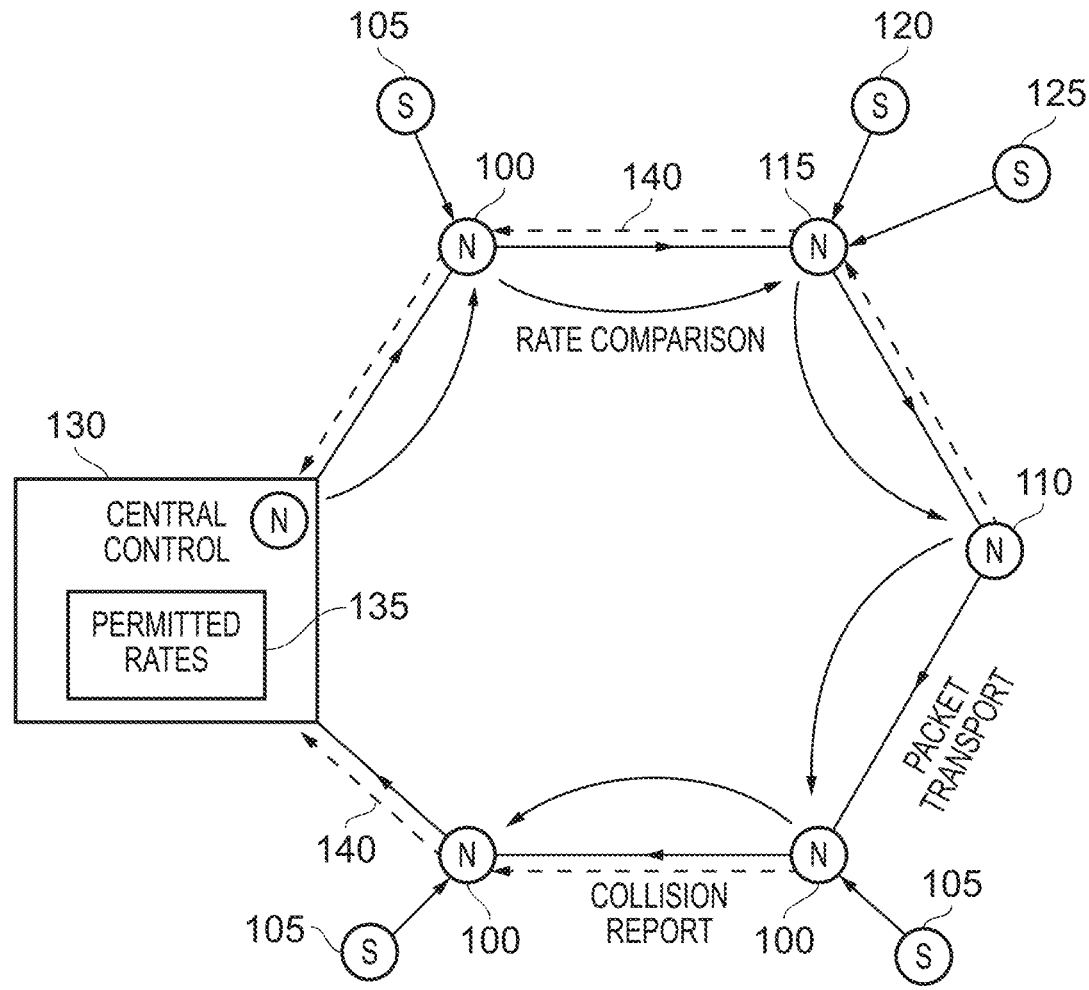
FIG. 3 schematically illustrates a ring interconnect system in accordance with some disclosed examples.

FIG. 3 schematically illustrates a ring interconnect system in accordance with some disclosed examples. Here, as in the example configuration shown in FIG. 1, a ring interconnect is formed by a plurality of nodes coupled in a ring configuration by means of a packet transport path around which packets can be conveyed. In this example system there is some heterogeneity of the types of nodes provided and the number packet sources coupled to them. Hence, whilst there are three instances of nodes 100 which each have a single packet source 105 coupled to them, one node 110 does not have an associated packet source, and one node 115 is coupled to two packet sources 120, 125. Moreover, it is to be noted that the central controller 130 is itself comprised in one of the nodes forming part of the ring interconnect. As in all cases herein, the central controller 130 generally administers control over the ring interconnect and in particular determines the respective rates with which each packet source 105, 120, 125 is permitted to issue packets for transport via the ring interconnect. The central controller 130 holds a set 135 of permitted rate indications so corresponding to the plurality of packet sources. Each packet source of the plurality of packet sources is arranged to issue packets for transportation via the interconnect at a rate in accordance with its corresponding permitted rate indication.

As described above for the example of FIG. 1, each of the plurality of nodes in FIG. 3 is arranged to convey incoming packets from (one of) its respective packet source(s) onto the interconnect, whereby this may involve arbitration between such ingressing packets and packets which are already being transported around the interconnect. In the event of a packet collision event (of whatever variety) the relevant node is arranged to send a collision report to the central controller. FIG. 3 shows dedicated paths (dashed lines) 140 for this purpose. In fact, it can be seen that the collision report paths are essentially formed in two parts in the example of FIG. 3, whereby from node 110 a first path leads anti-clockwise around the interconnect to the central controller, whilst from the node 100 lower right in the figure a second path leads clockwise around the interconnect to the central controller. This configuration results from the approach taken in this example, whereby the nodes are each configured to combine their own collision reports (i.e. those reported as occurring at or in association with that particular node) with collision reports from other "upstream" nodes, such that the central controller is provided with a more compact set of signals representing the packet collisions which have occurred. In particular, this is achieved by the nodes having combination circuitry arranged to combine multiple collision reports pertaining to a particular packet source into a single indication of the particular packet source. Of course, in such an arrangement in a least one node does not have any other nodes upstream of it and simply passes its collision reports to another node downstream of it. As will be described in more detail with reference to the figures which follow, such collision report combination circuitry may comprise OR-logic arranged at each node.

In support of the nodes, generating their packet collision reports, the central controller periodically sends rate comparison information to the nodes. This rate comparison information is generated by the central controller on the basis of the set of permitted rates 135 which it holds. In particular, the rate comparison information is an indication, for each pair of packet sources, which currently has the higher permitted rate. This triangular matrix of data (see FIG. 4B for an example) thus represents an efficient encoding of this comparison information. Moreover, the distribution of this rate comparison information from the central controller 130 to the nodes can be broadcast in a manner which consumes little communication bandwidth. In the illustrated example, a small data packet begins at the central controller and is passed between the nodes in a round-robin fashion. This data packet may be further reduced in size, if required, in examples in which the data packet is encoded using data differencing, i.e. where an update to the data set only comprises differences with respect to a previously sent data set. Importantly, each of the nodes makes use of the rate comparison information to form the basis of its packet collision reports. Specifically, in the event of a packet collision at a given node between packets associated with a first source and a second source, the node references the most recent version of the rate comparison information provided by the central controller and identifies which of the first source and the second source currently has the higher permitted rate. This source is then reported to the central controller as the "culprit", nominally identified as being responsible for the packet collision. Indeed, in such examples the only information sent from the node to the central controller as the packet collision report is an indication of the responsible source node. This means that the above mentioned combining of packet collision reports generated by the nodes can be implemented by the simple mechanism of logical OR functions being provided in each node to combine incoming indications of responsible source nodes (generated elsewhere) with any locally generated indication. As a result, the central controller can be arranged to receive a single set of signal lines, having a multiplicity corresponding to the number of source nodes, where an active signal on any of those lines indicates that the corresponding source node has been responsible for at least one packet collision event in the system (in the most recent relevant time frame in which packet collision events are reported).

In response the central controller is arranged to make corresponding modifications to the set of permitted rates 135 which it holds, corresponding to each of the reported "culprit" sources, which each have their permitted rate reduced. This process continues, with received packet collision reports causing the identified source having the currently higher permitted rate to have its permitted rate reduced. Moreover, as in the examples described above the reductions are not monotonic, and the central controller is arranged periodically to increase the permitted rate indications of all of the plurality of packet sources (subject to a maximum permitted rate indication for each of the plurality of packet sources, which may be universal or may be individually defined for the respective packet sources).

FIG. 4A shows a table giving example permitted rate indications for a number of source nodes coupled to an interconnect in accordance with some disclosed examples. Corresponding to this, FIG. 4B shows a table giving example rate comparison data for a number of source nodes coupled to an interconnect in accordance with some disclosed examples. The set bit ("1") values in the table of FIG. 4B indicate which of the first and the second source currently have the higher permitted rate defined in the table of FIG. 4B. Merely for the purposes of example illustration, if the permitted rate values R0-R5 were to be 1.0, 0.5, 0.6, 0.2, 0.9, and 0.8 respectively, the rate comparison data shown in FIG. 4B would result.

Figure 5:
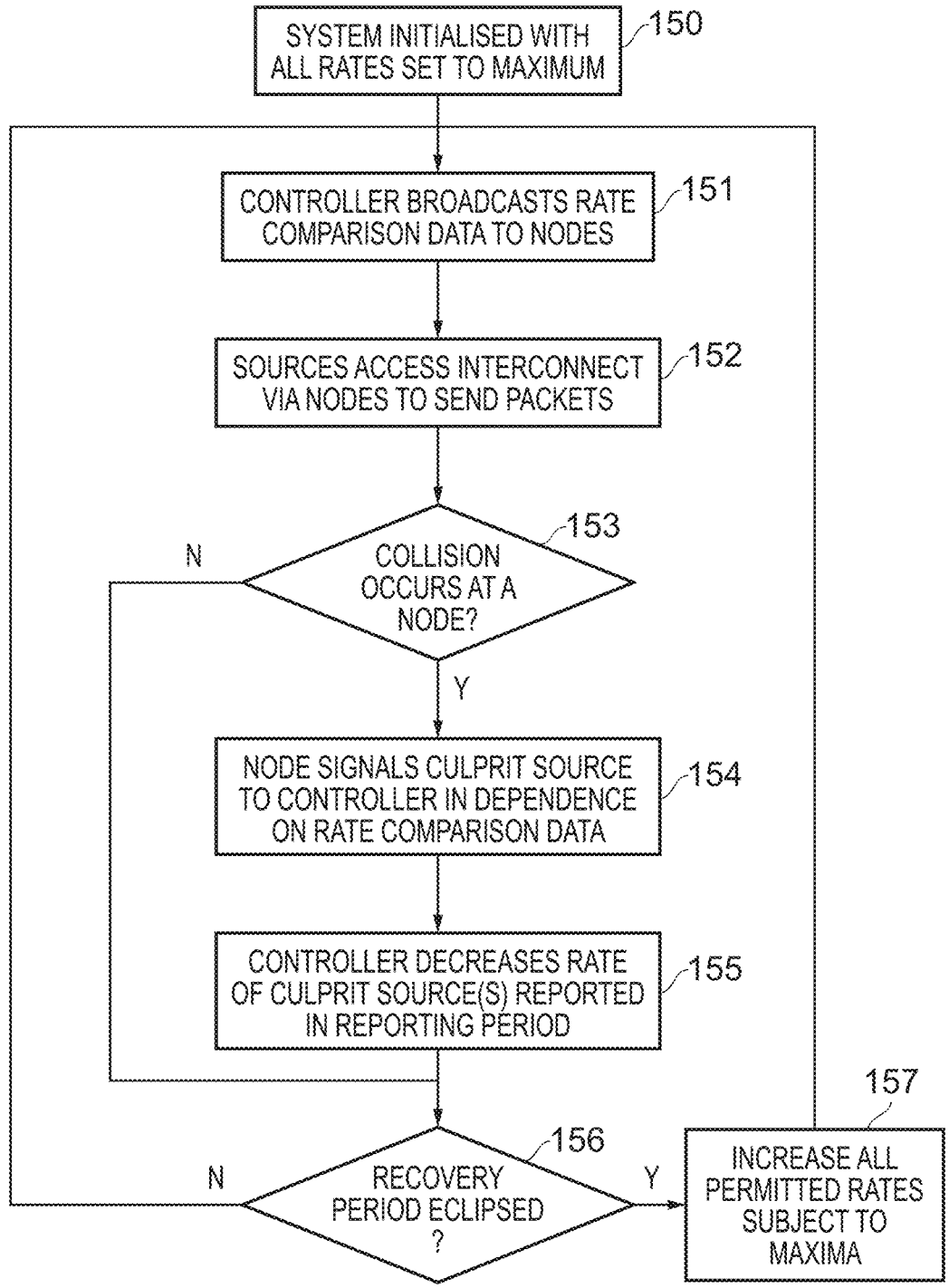
FIG. 5 is a flow diagram showing a sequence of steps which are taken in accordance with the method of some disclosed examples.

FIG. 5 is a flow diagram showing a sequence of steps which are taken in accordance with the method of some disclosed examples. The flow begins at an initialisation step 150 where the system is initialised with all permitted rates set to respective maxima. Note that these maxima may correspond to a universal maximum used for all source nodes, or these may be individually set. Once the system begins operation then at step 151 the central controller broadcast the rate comparison data to the nodes. It should be noted that in a situation in which two (or possibly all) source nodes have the same permitted rate, then the central controller will have a defined choice which it makes for the purpose of generating the rate comparison data in regard to which of two source nodes with the same permitted rate is indicated to have the nominally higher rate, whereby this of course means that that nominally higher rate source node will be deemed to be the "culprit" when a packet collision event occurs involving these two source nodes. Normal operation of the nodes and the interconnect takes place, represented by step 152, at which the sources access the interconnect by the nodes to send their respective packets. At step 153 determined if a collision has occurred at any node. When this is not the case the flow proceeds directly to step 156. However, when a packet collision event is determined to have occurred at step 153, at step 154 the relevant node(s) signal(s) the culprit source(s) to the central controller in dependence on the rate comparison data received from the central controller. At step 155, in response to that report or those reports, the central controller decreases the rate of the corresponding source(s). The flow then proceeds to step 156. At step 156 it is determined at the central controller whether a predefined recovery period (for the permitted rates) has elapsed. Whilst it is not then the flow returns to step 151 and the process continues. However, if the predefined recovery period has elapsed, then the flow proceeds to step 157 at which the central controller increases all of the permitted rates.

Figure 6:
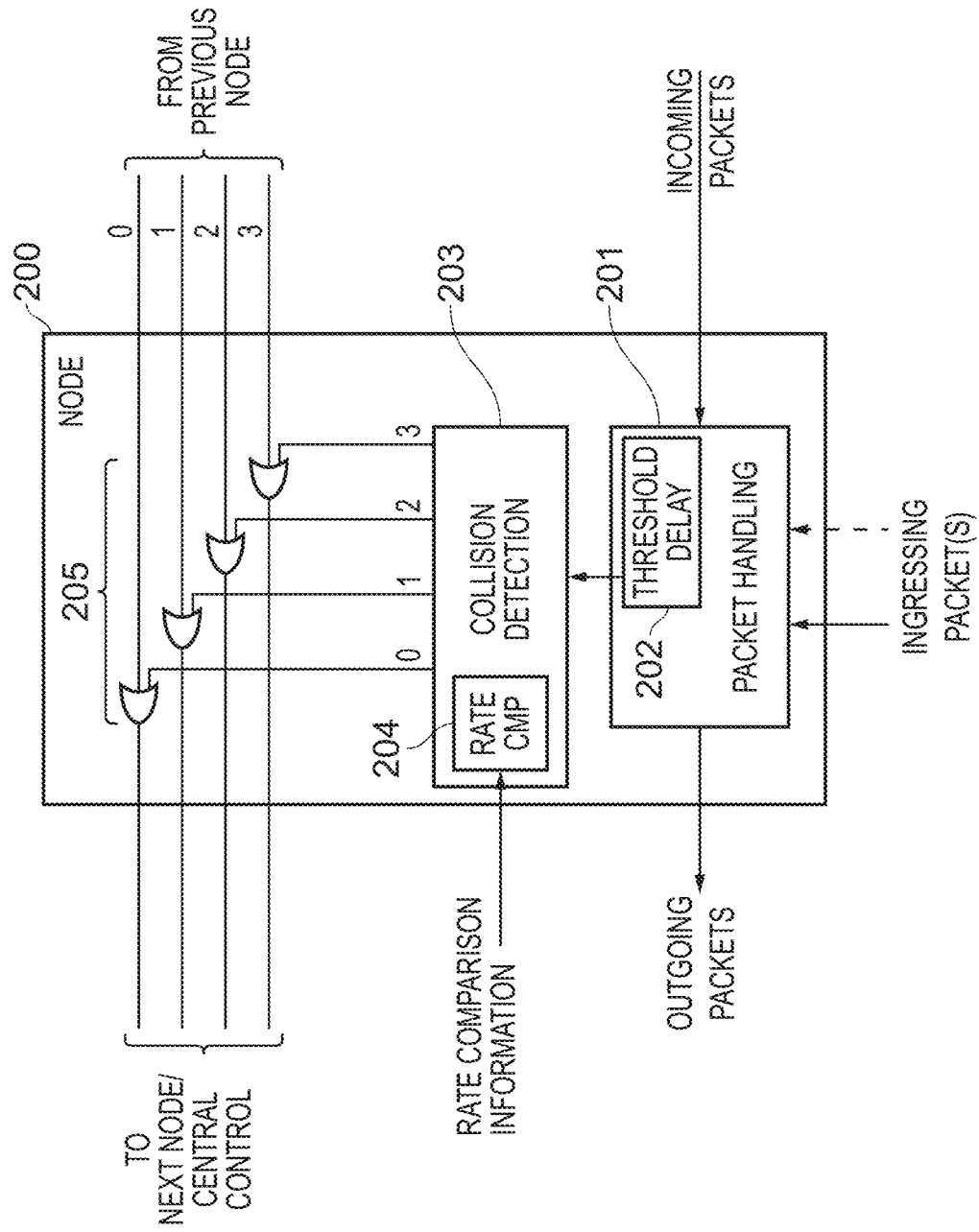
FIG. 6 schematically illustrates a node and some of its subcomponents in accordance with some disclosed examples.

FIG. 6 schematically illustrates a node and some of its subcomponents in accordance with some disclosed examples. This node 200 is shown to receive incoming packets (from upstream in the interconnect) and to issue outgoing packets (to downstream in the interconnect), as well as to receive new packets for transport on the interconnect from one or more sources associated with this node. The handling of these packets for this purpose is carried out by the packet handling circuitry 201. The specific detail of the configuration of this packet handling circuitry 201 are not of significance here, other than the provision of a defined threshold delay 202 for the packet handling circuitry 201. The packet handling circuitry 201 performs its packet handling, arbitrating between one or more incoming packets and one or more ingressing packets to issue outgoing packets to the interconnect. In the event that a packet is delayed by more than the defined threshold delay 202 by another packet, the two sources of the respective packets are signalled to the collision detection circuitry 203. Merely for the purpose of simplicity and clarity of illustration, the example of FIG. 6 represents a configuration when there are only four sources of packets in the system. The collision detection circuitry 203 holds the rate comparison information 204 distributed by the central controller and on receipt of information from the packet handling circuitry 201 indicating the two sources involved in the packet collision event, with reference to the rate comparison information 204 the collision detection circuitry 203 provides an active signal on one of its output lines (0-3). A corresponding set of "culprit source" reporting lines (0-3) is coupled to node 200 from a previous (upstream) node in the interconnect. The node 200 further comprises a set of OR gates 205, which combine the respective reporting lines from the collision detection circuitry 203 and those from the previous node in the interconnect. Hence, an output set of reporting lines is generated which is passed either to the next node (downstream) in the interconnect or to the central controller, if the node 200 is the last node prior to the central controller. Accordingly, the central controller thus receives a set of signal lines corresponding to the sources in the system, and an active signal on any of these indicates that the corresponding source has been associated with a packet collision event in at least one of the nodes on the interconnect.

Figure 7:
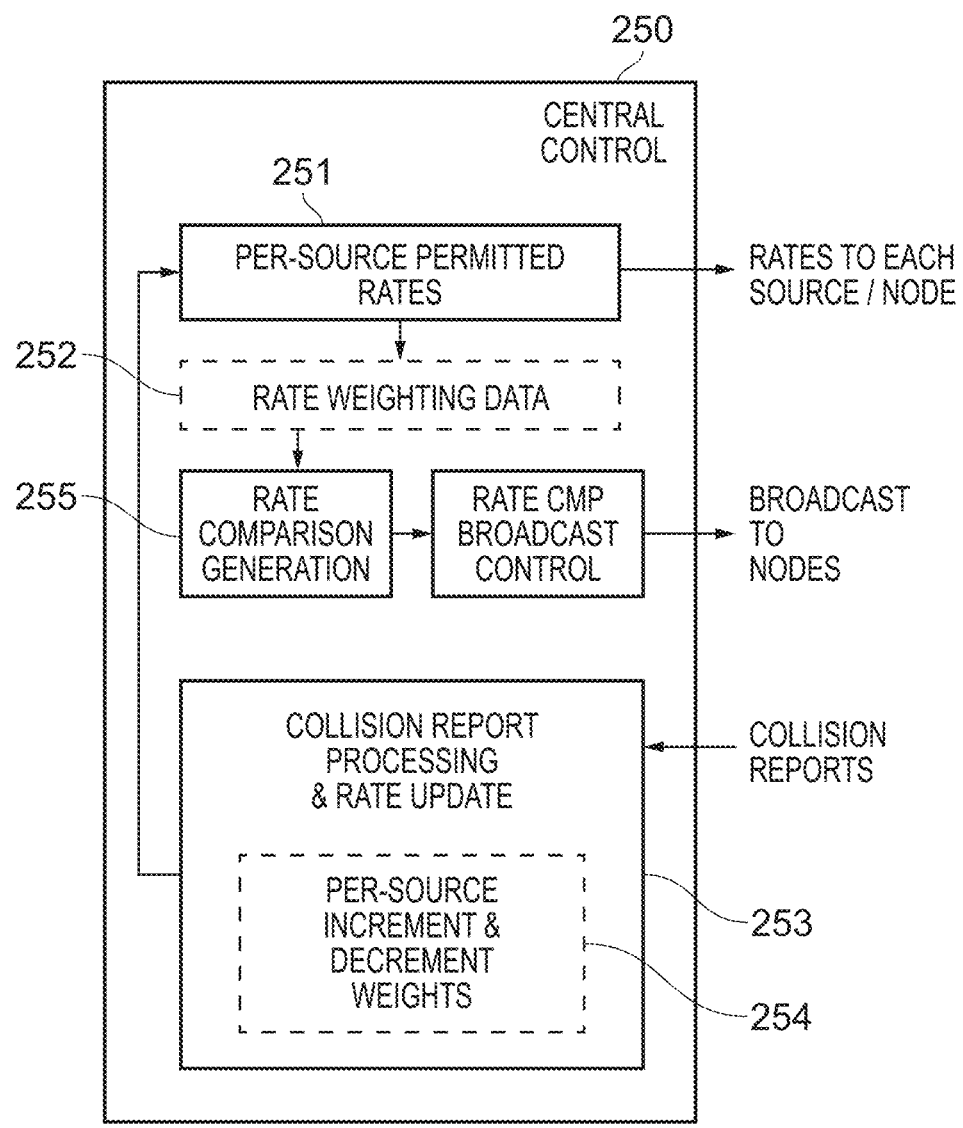
FIG. 7 schematically illustrates a central controller and some of its subcomponents in accordance with some disclosed examples.

FIG. 7 schematically illustrates a central controller and some of its subcomponents in accordance with some disclosed examples. The central controller 250 receives packet collision reports (e.g. in the form of a set of signal lines having a multiplicity corresponding to the number of sources, as described above) and this is received by collision report processing and rate update circuitry 253. The collision report processing and rate update circuitry 253 causes modifications to be made to the per source permitted rate 251 held by the central controller 250. In some examples, the modification (decrement) which is applied to the permitted rate 251 is predefined and immutable, however the dashed box 254 illustrates a variant example in which the central control also holds per source increment and decrement weights, allowing the possibility for the modifications to the per source permitted rates 251 to be individualised for the respective sources. Thus, when a source permitted rate is decreased as a result of a packet collision event, that decrease can be tailored to the individual source. Equally when the predetermined recovery time for the permitted rates elapses, and increment applied to a given source can be tailored to that individual source. This is not essential however and in some examples the decrements and increments of the same for all sources. The central control 250 is also responsible for distributing the per source permitted rate 251 to the corresponding source nodes, such that they can operate in accordance with those defined permitted rates. The communication of these permitted rates may either take place via the interconnect itself or by a dedicated communication path as appropriate to the implementation. The central control 250 also distributes rate comparison information to the nodes of the interconnect, where this rate comparison information is generated by the central control 250 on the basis of the per source permitted rate 251. Generally speaking, the generation of this rate comparison information, performed by the rate comparison generation circuitry 255, indicates which of each pair of sources currently has a higher permitted rate. This determination may be made without additional waiting in some examples, but the dashed box 252 in FIG. 7 indicates that in an alternative variant the central control 250 may also hold rate weighting data 252, enabling the rate comparison generation circuitry 2552 bias the comparisons between source permitted rates. It will therefore be understood that generally speaking the provision of the rate weighting data 252 and the per source increment/decrement weights 254 are alternative techniques, which broadly speaking achieve the same purpose, namely allowing the central control 250 to prioritise some sources over others in their permitted usage of the interconnect bandwidth.

Figure 8:
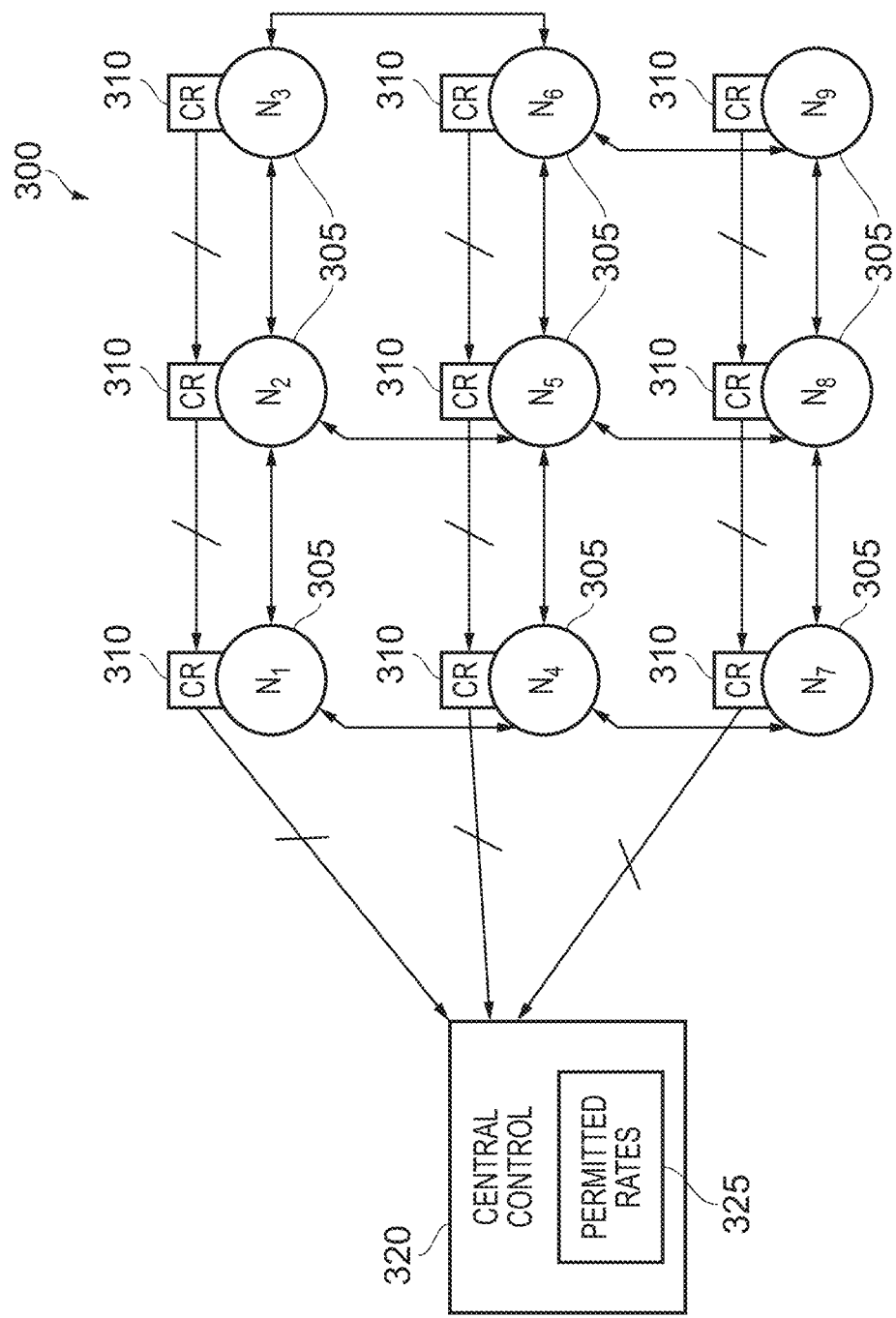
FIG. 8 schematically illustrates a mesh interconnect system in accordance with some disclosed examples.

FIG. 8 schematically illustrates a mesh interconnect system 300 in accordance with some disclosed examples. A set of nodes $N_1$-$N_9$ 305 is shown, arranged to form a mesh interconnect 300, i.e. an arrangement of nodes coupled together by multiple packet transport paths such that, generally speaking, there is more than one path which can be followed between any two nodes. In this example, for simplicity of illustration, a node may be considered to be synonymous with a source, i.e. each node may also be considered to be a source of packets. Each node 305 is provided with packet collision reporting circuitry 310, where these instances of packet collision reporting circuitry 310 are concatenated, for example in the manner described with respect to the node shown in FIG. 6, to provide a combined set of collision reports. In fact, in the example of FIG. 6 the collision reports are combined to form three sets of collision report signals which reach the central control 320, but it will be apparent to one of ordinary skill in the art that many variations of the combinatorial configurations for these collision reports are possible. The central control 320 updates the permitted rate indications 325 which it holds for the sources (nodes) on the basis of the collision reports received. The collision reports received are (in accordance with some of the examples described above) in the form of an indication of a "culprit" packet source, this being the packet source which currently has the higher permitted rate, and where the central control 320 distributes rate comparison information derived from the permitted rates to the nodes 305.

Various example configurations of the present techniques are set out in the following numbered clauses:

Clause 1. An interconnect system comprising:
a plurality of nodes coupled via a packet transport path to form an interconnect, wherein the plurality of nodes provides ingress points to the interconnect for a plurality of packet sources, and
a central controller arranged to maintain a permitted rate indication corresponding to each packet source of the plurality of packet sources, wherein each packet source of the plurality of packet sources is arranged to send packets via the interconnect in accordance with its corresponding permitted rate indication,
wherein each node of the plurality of nodes is responsive to occurrence of a packet collision event at that node to send a collision report to the central controller,
wherein the central controller is responsive to receipt of the collision report, in respect of a collision pair of packet sources associated with the packet collision, to decrease the permitted rate indication corresponding to a packet source of the collision pair of packet sources which currently has the higher permitted rate indication,
and wherein the central controller is arranged periodically to increase the permitted rate indications of all of the plurality of packet sources, subject to a maximum permitted rate indication for each of the plurality of packet sources.

Clause 2. The interconnect system as defined in clause 1, wherein the central controller is arranged to transmit rate comparison information to the plurality of nodes, wherein the rate comparison information indicates for each pair of packet sources which packet source currently has a higher permitted rate indication.
and wherein the collision report comprises an indication, for the pair of packet sources associated with the new packet and the older packet, a culprit packet source, wherein the culprit packet source is the packet source of the collision pair of packet sources which is indicating as having the higher permitted rate indication in the rate comparison information transmitted to the plurality of nodes.

Clause 3. The interconnect system as defined in clause 2, wherein the central controller is arranged to broadcast the rate comparison information to the plurality of nodes.

Clause 4. The interconnect system as defined in clause 3, wherein the central controller is arranged to iteratively broadcast the rate comparison information to the plurality of nodes over a plurality of broadcast cycles.

Clause 5. The interconnect system as defined in clause 3 or clause 4, wherein the central controller is arranged to broadcast the rate comparison information to the plurality of nodes as a series of updates, wherein each update of the series of updates conveys changes to the rate comparison information since a last update.

Clause 6. The interconnect system as defined in any of clauses 2-5, wherein the central controller is arranged to transmit the rate comparison information to the plurality of nodes via a dedicated rate comparison information signal path distinct from the packet transport path.

Clause 7. The interconnect system as defined in any of clauses 1-6, wherein each node of the plurality of nodes is arranged to send the collision report to the central controller via a dedicated collision report signal path distinct from the packet transport path.

Clause 8. The interconnect system as defined in clause 7, further comprising collision report combination circuitry arranged to combine multiple collision reports pertaining to a particular packet source into a single indication of the particular packet source.

Clause 9. The interconnect system as defined in clause 8, wherein the collision report combination circuitry comprises local OR-logic arranged at each node of the plurality of nodes to forward the single indication of the particular packet source when either a collision report for the particular packet source is received from another node or a local collision report for the particular packet source is generated at that node.

Clause 10. The interconnect system as defined in any of clauses 1-9, wherein the packet collision event comprises at least one of:
ingress of a new packet to the interconnect being delayed by an older packet already being transported via the interconnect;
ingress of a first new packet to the interconnect being delayed by substantially simultaneous ingress of a second new packet to the interconnect;
a first in-transport packet being delayed by attempting to use a route or access a packet sink which is respectively in use or being accessed by a second in-transport packet being transported via the interconnect; or
an interconnect-exiting packet being unable to be accepted by a packet sink due to the packet sink temporarily being full.

Clause 11. The interconnect system as defined in clause 10, wherein the packet collision event comprises a delay of more than a defined threshold delay.

Clause 12. The interconnect system as defined in clause 2, or in any of clauses 3-11 when dependent on clause 2, wherein the central controller is arranged to apply a per-packet-source weight to the rate comparison information transmitted to the plurality of nodes.

Clause 13. The interconnect system as defined in any of clauses 1-12, wherein the central controller is arranged to decrease the permitted rate indications by a weighted decrement individually defined for each packet source.

Clause 14. The interconnect system as defined in any of clauses 1-13, wherein the central controller is arranged to increase the permitted rate indications by a weighted increment individually defined for each packet source.

Clause 15. The interconnect system as defined in any of clauses 1-14, comprising at least one node of the plurality of nodes which provides an ingress point to the interconnect for a plurality of packet sources.

Clause 16. The interconnect system as defined in any of clauses 1-15, comprising at least one node of the plurality of nodes which does not provide an ingress point to the interconnect for a packet source.

Clause 17. The interconnect system as defined in any of clauses 1-16, wherein the central controller is comprised in a node of the plurality of nodes.

Clause 18. The interconnect system as defined in any of clauses 1-17, wherein the plurality of nodes is coupled via the packet transport path to form a ring interconnect.

Clause 19. The interconnect system as defined in any of clauses 1-17, wherein the plurality of nodes is coupled via the packet transport path to form a mesh interconnect.

Clause 20. A method of operating an interconnect system comprising:
coupling a plurality of nodes via a packet transport path to form an interconnect, wherein the plurality of nodes provides respective ingress points to the interconnect for a plurality of packet sources;
maintaining in a central controller a permitted rate indication corresponding to each packet source of the plurality of packet sources, wherein each packet source of the plurality of packet sources is arranged to send packets via the interconnect in accordance with its corresponding permitted rate indication;
responding, at each node of the plurality of nodes, to occurrence of a packet collision event at that node by sending a collision report to the central controller;
responding, at the central controller, to receipt of the collision report, in respect of a collision pair of packet sources associated with the packet collision, by decreasing the permitted rate indication corresponding to a packet source of the collision pair of packet sources which currently has the higher permitted rate indication; and
periodically increasing the permitted rate indications of all of the plurality of packet sources, subject to a maximum permitted rate indication for each of the plurality of packet sources.

In brief overall summary, interconnect systems and method of operating such are disclosed. A plurality of nodes coupled via a packet transport path form an interconnect and the nodes provide ingress points to the interconnect for a plurality of packet sources. A central controller holds permitted rate indications for each of the plurality of packet sources, in accordance with which each packet source sends packets via the interconnect. The nodes each respond to packet collision event at that node by sending a collision report to the central controller. In response the central controller, in respect of a collision pair of packet sources associated with the packet collision, decreases the permitted rate indication corresponding to a packet source of the collision pair of packet sources which currently has the higher permitted rate indication. Periodically the permitted rate indications of all of the packet sources are increased, subject to a maximum permitted rate indication for each.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An interconnect system comprising:
a plurality of nodes coupled via a packet transport path to form an interconnect, wherein the plurality of nodes provides ingress points to the interconnect for a plurality of packet sources; and
a central controller arranged to maintain a permitted rate indication corresponding to each packet source of the plurality of packet sources, wherein each packet source of the plurality of packet sources is arranged to send packets via the interconnect in accordance with its corresponding permitted rate indication,
wherein each node of the plurality of nodes is responsive to occurrence of a packet collision event at that node to send a collision report to the central controller,
wherein the central controller is responsive to receipt of the collision reports, identifying a collision pair of packet sources associated with the packet collision corresponding to a collision report of the collision reports,
wherein the central controller is further arranged to decrease the permitted rate indication corresponding to a packet source of the identified collision pair of packet sources which currently has a higher permitted rate indication than the other one of the packet sources of the identified collision pair of packet sources in order to cause the packet source of the identified collision pair of packet sources, which currently has the higher permitted rate indication, to send packets at a lower rate, and
wherein the central controller is arranged to periodically increase the permitted rate indications of all of the plurality of packet sources, subject to a maximum permitted rate indication for each of the plurality of packet sources.

2. The interconnect system as claimed in claim 1, wherein the central controller is arranged to transmit rate comparison information to the plurality of nodes, wherein the rate comparison information indicates for each pair of packet sources which packet source currently has a higher permitted rate indication, and
wherein the collision report comprises an indication, for the pair of packet sources associated with a new packet and an older packet, a culprit packet source, wherein the culprit packet source is the packet source of the identified collision pair of packet sources which is indicating as having the higher permitted rate indication in the rate comparison information transmitted to the plurality of nodes.

3. The interconnect system as claimed in claim 2, wherein the central controller is arranged to broadcast the rate comparison information to the plurality of nodes.

4. The interconnect system as claimed in claim 3, wherein the central controller is arranged to iteratively broadcast the rate comparison information to the plurality of nodes over a plurality of broadcast cycles.

5. The interconnect system as claimed in claim 3, wherein the central controller is arranged to broadcast the rate comparison information to the plurality of nodes as a series of updates, wherein each update of the series of updates conveys changes to the rate comparison information since a last update.

6. The interconnect system as claimed in claim 2, wherein the central controller is arranged to transmit the rate comparison information to the plurality of nodes via a dedicated rate comparison information signal path distinct from the packet transport path.

7. The interconnect system as claimed in claim 1, wherein each node of the plurality of nodes is arranged to send the collision report to the central controller via a dedicated collision report signal path distinct from the packet transport path.

8. The interconnect system as claimed in claim 7, further comprising collision report combination circuitry arranged to combine multiple collision reports pertaining to a particular packet source into a single indication of the particular packet source.

9. The interconnect system as claimed in claim 8, wherein the collision report combination circuitry comprises local OR-logic arranged at each node of the plurality of nodes to forward the single indication of the particular packet source when either a collision report for the particular packet source is received from another node or a local collision report for the particular packet source is generated at that node.

10. The interconnect system as claimed in claim 1, wherein the packet collision event comprises at least one of:
ingress of a new packet to the interconnect being delayed by an older packet already being transported via the interconnect;
ingress of a first new packet to the interconnect being delayed by substantially simultaneous ingress of a second new packet to the interconnect;
a first in-transport packet being delayed by attempting to use a route or access a packet sink which is respectively in use or being accessed by a second in-transport packet being transported via the interconnect; or
an interconnect-exiting packet being unable to be accepted by a packet sink due to the packet sink temporarily being full.

11. The interconnect system as claimed in claim 10, wherein the packet collision event comprises a delay of more than a defined threshold delay.

12. The interconnect system as claimed in claim 2, wherein the central controller is arranged to apply a per-packet-source weight to the rate comparison information transmitted to the plurality of nodes.

13. The interconnect system as claimed in claim 1, wherein the central controller is arranged to decrease the permitted rate indications by a weighted decrement individually defined for each packet source.

14. The interconnect system as claimed in claim 1, wherein the central controller is arranged to increase the permitted rate indications by a weighted increment individually defined for each packet source.

15. The interconnect system as claimed in claim 1, comprising at least one node of the plurality of nodes which provides an ingress point to the interconnect for a plurality of packet sources.

16. The interconnect system as claimed in claim 1, comprising at least one node of the plurality of nodes which does not provide an ingress point to the interconnect for a packet source.

17. The interconnect system as claimed in claim 1, wherein the central controller is comprised in a node of the plurality of nodes.

18. The interconnect system as claimed in claim 1, wherein the plurality of nodes is coupled via the packet transport path to form a ring interconnect.

19. The interconnect system as claimed in claim 1, wherein the plurality of nodes is coupled via the packet transport path to form a mesh interconnect.

20. A method of operating an interconnect system comprising:
- coupling a plurality of nodes via a packet transport path to form an interconnect, wherein the plurality of nodes provides respective ingress points to the interconnect for a plurality of packet sources;
- maintaining in a central controller a permitted rate indication corresponding to each packet source of the plurality of packet sources, wherein each packet source of the plurality of packet sources is arranged to send packets via the interconnect in accordance with its corresponding permitted rate indication;
- responding, at each node of the plurality of nodes, to occurrence of a packet collision event at that node by sending a collision report to the central controller;
- responding, at the central controller, to receipt of the collision report, to identify a collision pair of packet sources associated with the packet collision corresponding to a collision report of the collision reports, by decreasing the permitted rate indication corresponding to a packet source of the identified collision pair of packet sources which currently has a higher permitted rate indication than the other one of the packet sources of the identified collision pair of packet sources, in order to cause the packet source of the collision pair of packet sources, which currently has the higher permitted rate indication, to send packets at a lower rate; and
- periodically increasing the permitted rate indications of all of the plurality of packet sources, subject to a maximum permitted rate indication for each of the plurality of packet sources.

\* \* \* \* \*